March 3, 1959 W. W. ROBERTS, JR 2,876,070
METHOD FOR PRODUCING HYDROGEN SULFIDE BY SYNTHESIS
Filed March 28, 1955 3 Sheets-Sheet 1
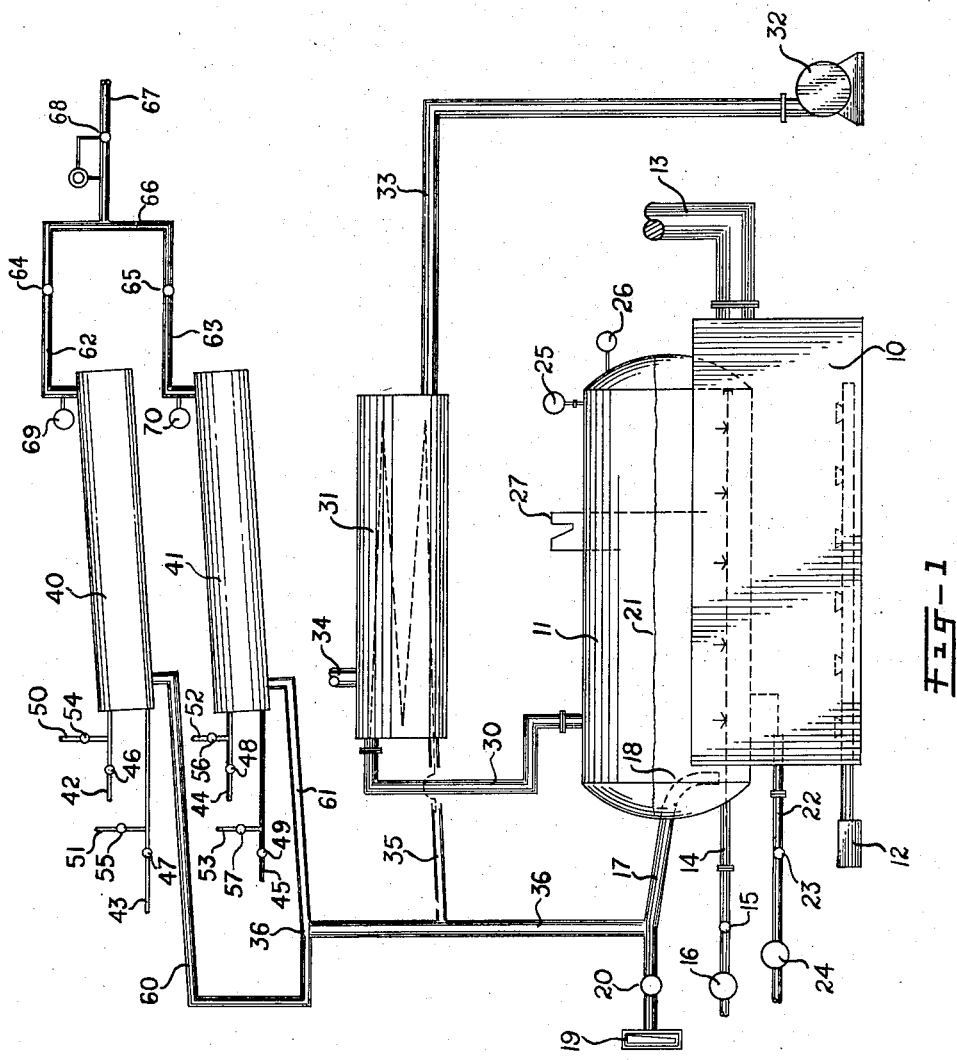
INVENTOR
WILLIAM W. ROBERTS, JR.
BY W E Sherwood
ATTORNEY

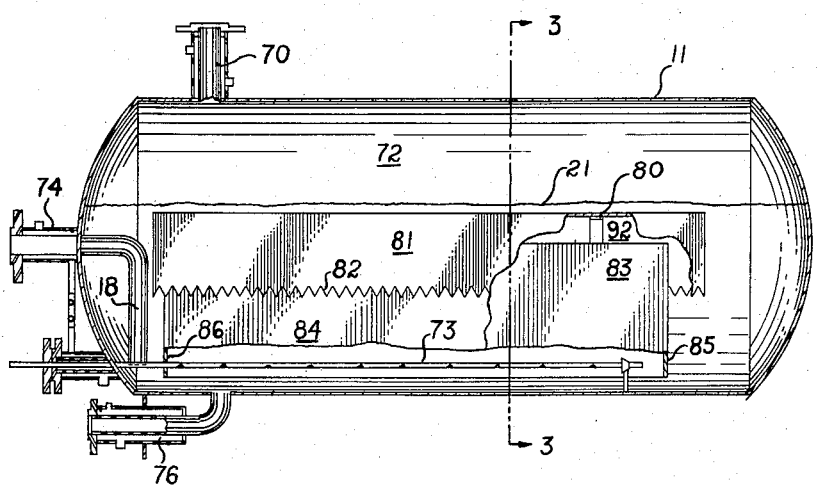
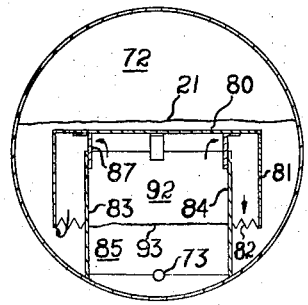

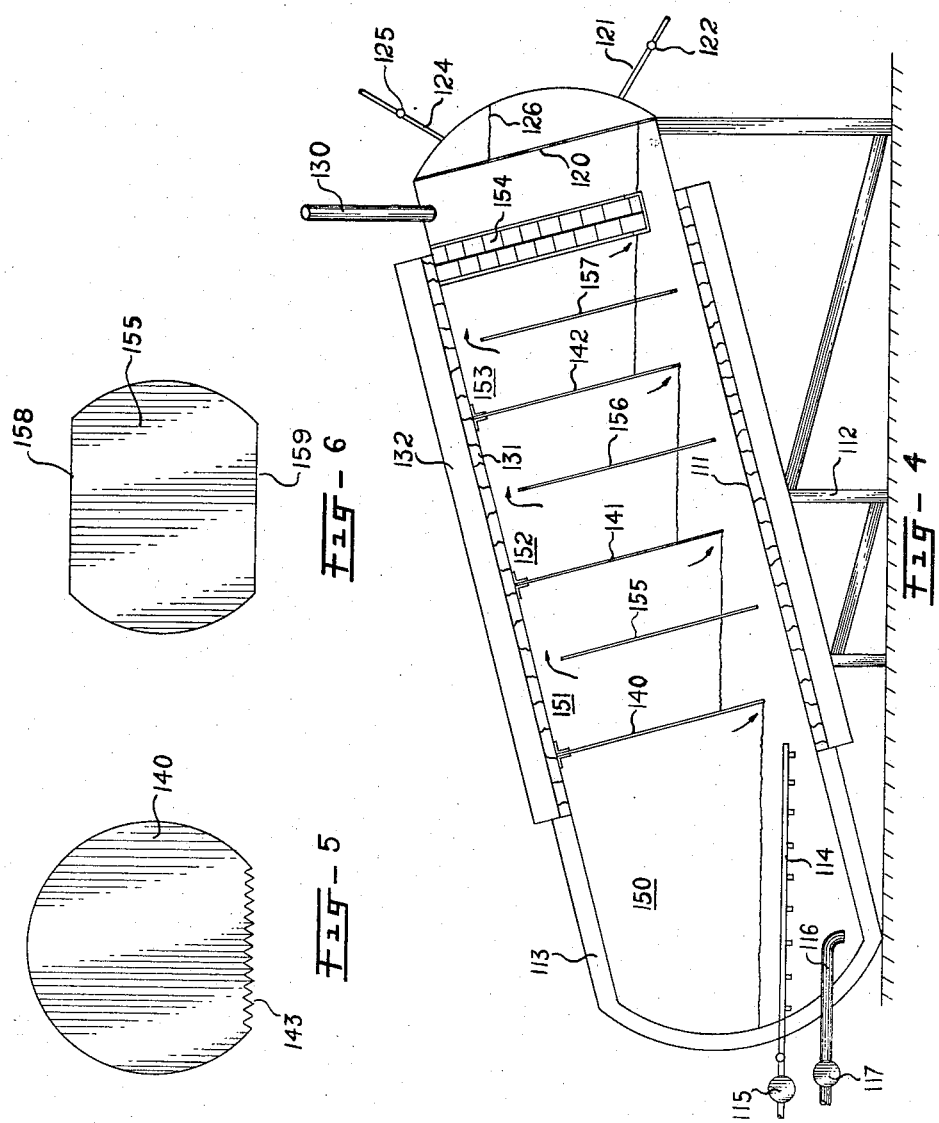

United States Patent Office 2,876,070
Patented Mar. 3, 1959

2,876,070

METHOD FOR PRODUCING HYDROGEN SULFIDE BY SYNTHESIS

William W. Roberts, Jr., Louisville, Ky., assignor to Chemetron Corporation, a corporation of Delaware Application March 28, 1955, Serial No. 497,217

10 Claims. (Cl. 23—181)

This invention relates generally to the production of hydrogen sulfide and more particularly to an improved method for producing the same by synthesis from its elements.

As is known to those skilled in the art, the processing and handling of hydrogen sulfide presents certain unique problems which, in the absence of due precautions, make such operations a rather hazardous undertaking. The compound is highly toxic; in the presence of water or at high temperatures it is corrosive to most commonly used action; and the unreacted sulfur when cooled may quickly plug up processing conduits. For example, Maude et al., Patent 2,214,859, state that conducting the synthesis reaction at pressures in the range of five to ten atmospheres is too hazardous to be commerciably practicable, and Preisman et al., Patent 2,474,066, state that an object of their invention is to carry out the process at not more than ten pounds per square inch pressure so that the method may be non-hazardous to perform. These later patentees, therefore, had recourse to the use of catalytic materials permitting them to carry out a synthesis at a lower pressure than the earlier patent to Bacon, 1,700,578, which used the range of pressure which they regarded as hazardous.

I have now discovered that by an improved manner of contacting the reactants while under substantial pressure, many of the former hazards of processing and handling synthesized hydrogen sulfide may be eliminated, and that an efficient, safe, and economical process accordingly may be used.

A prime object of the invention, therefore, is to provide an improved process of synthesizing hydrogen sulfide by gas phase reaction of extended duration.

A second object is to provide a process for utilizing the heat of reaction during the synthesis of hydrogen sulfide in such a manner as to reduce the external heating and subsequent cooling load upon the apparatus employed.

A third object is to provide a process for carrying out a gas phase reaction between sulfur and hydrogen while at least a portion of the reactants are submerged in a bath of sulfur.

A fourth object is to provide a process for synthesizing hydrogen sulfide without requiring a catalyst and while promoting an efficient utilization of the hydrogen gas.

Other objects and advantages will become apparent to those skilled in the art when the following description is considered in conjunction with the accompanying drawings in which:

Fig. 1 is a view illustrating a preferred arrangement of apparatus suitable for carrying out the process.

Fig. 2 is a sectional view taken longitudinally of a reactor vessel suitable for use in the process.

Fig. 3 is a sectional view taken on line 3—3 of Fig. 2.

Fig. 4 is a schematic view of a second form of apparatus suitable for carrying out the process.

Fig. 5 is an elevation view of a typical zone-defining baffle which may conveniently be employed in apparatus of the type shown in Fig. 4, and Fig. 6 is an elevation view of a typical intermediate baffle which may be employed in the apparatus of Fig. 4.

As will be noted in the following description, the invention employs heat exchange at certain processing stages, not only for the resulting savings in heating and cooling loads, but also for the purpose of additional safety in operation. As is known, the reaction $S+H_2=H_2S+$heat, is highly exothermic. For example, in converting about 117 pounds per hour of sulfur into hydrogen sulfide by reaction with about 7.4 pounds per hour of hydrogen, it is estimated that the exothermic reaction would produce about 66,000 B. t. u. per hour. However, in order to bring the reactants to their reaction temperatures about 69,000 B. t. u. per hour would have to be supplied to apparatus containing such reactants. When the reaction between sulfur vapor and hydrogen is conducted in a separate vessel from that in which the main body of sulfur is contained, as in conventional processes employing catalysts, not only must the external heating requirement be satisfied, but also the cooling apparatus must handle the combined amount of heat resulting from the exothermic reaction and the initial heat supplied externally. In order to cool the products down to usable conditions in such a situation it is estimated that the cooling load would be above 121,000 B. t. u. per hour. In contrast with the foregoing situation, I have discovered that it is practicable to utilize an amount of exothermic heat in lieu of an amount of the separately required external heat while carrying forward the reaction. The invention, therefore, comprises an arrangement wherein a gas phase reaction between the reactants takes place in a single vessel with a heat exchange therein which materially lowers the requirement for external heating and the requirment for subsequent cooling.

While catalysts may be employed without departing from the broader aspects of the invention, it is preferred to conduct the process at a temperature and pressure which permits the reaction to proceed in the absence of a catalyst. Experience has shown that by following the teaching of the invention 96% or more of the hydrogen introduced may be converted into hydrogen sulfide and that substantially all of this conversion with the concomitant evolution of exothermic heat takes place before the gases leave the reactor vessel.

With these general considerations in mind, reference is made to Fig. 1 showing one arrangement for carrying out the invention. A conventional furnace 10 partially surrounds a heavy duty reactor vessel 11, the upper portion of which extends above the furnace. From a suitable source 12, fuel is supplied to the furnace for heating the lower portion of the vessel, the products of combustion being vented through stack 13.

Through a suitable conduit 14 controlled by valve 15, a supply of gaseous hydrogen is forced by pump 16 into the lower portion of reactor vessel 11. Also by means of conduit 17 extending into the reactor vessel through a liquid-vapor seal, such as the drop leg downcomer 18, a make-up quantity of molten sulfur is pumped into the vessel by a suitable pump 19 through a control valve 20. As later to be noted, the hydrogen and molten sulfur enter the vessel beneath the level 21 of liquid sulfur contained therein.

For purposes of draining the vessel, a conduit 22 controlled by valve 23 and connected to an exhaust pump 24 may be employed to direct the contents to a suitable place of storage when such drainage is desired. The vessel is also provided with conventional control devices, such as pressure gauge 25, thermometer 26, liquid level indicator 27 and the like.

At the top of the reactor vessel an outlet conduit 30 leads a mixture of the synthesized hydrogen sulfide, gaseous and entrained sulfur and a small amount of unreacted hydrogen into a cooling chamber 31 supplied with cooling air from blower 32 through conduit 33 and vented through stack 34. This chamber may be of a conventional tube and sheet construction with the tubes being inclined, so that sulfur vapor, as it condenses, together with any entrained sulfur may drain downwardly into inclined conduit 35 and thence through conduit 36 into conduit 17 for reintroduction into the reactor vessel. It will be understood that the sulfur system as thus far described, is under a superatmospheric pressure and that a head of molten sulfur is maintained in conduit 36 consonant with both the pressure maintained by pump 19 and the pressure above the sulfur level 21 in the reactor. Since liquid sulfur will solidify and cause plugging of conduits with consequent disruption of the process when its temperature drops below about 250° F., all sulfur conduits thus far described are steam jacketed and maintained above the solidifying temperature of the liquid sulfur therein. The non-condensible gases leaving cooler 31 through conduit 35 accordingly rise into a header line 36 and are led in parallel into two inclined heat exchangers 40 and 41, preferably of similar construction and capacity.

Within the heat exchangers 40 and 41 are systems of heat exchange piping which are provided with cold water inlets 42, 44 and outlets 43, 45 respectively, controlled by valves 46, 48 and 47, 49 respectively. Moreover, leading into the same piping systems within the heat exchangers are steam inlets 50, 52 and outlets 51, 53 respectively, controlled by valves 54, 56 and 55, 57 respectively. Leading into the heat exchangers from the header 36 are inclined steam jacketed conduits 60 and 61 respectively, and leading from the heat exchangers are gas outlet conduits 62 and 63 respectively. These outlet conduits are provided with outlet valves 64 and 65 respectively and join in gas header 66 which leads into a system outlet 67 controlled by a back pressure valve 68 of conventional construction. Pressure gauges 69 and 70 also are employed to indicate pressures existing within said heat exchangers.

By means of the apparatus thus described, it will be apparent that the pressure setting of valve 68 determines the pressures existing throughout the system, including the pressures which must be maintained by pumps 16 and 19 and also the height of liquid sulfur which is maintained under pressure in conduit 36. Since gases which separate from the liquid sulfur, draining back through conduit 35, still contain some sulfur it is found that a certain amount of sulfur condensation, and solidification, takes place within heat exchangers 40 and 41. Accordingly, it is preferable to operate the system by directing all of the gas stream from header 36 into a single heat exchanger until an accumulation of condensed sulfur occurs therein, after which the appropriate outlet valve may be closed and the gas stream directed into the companion heat exchanger whose outlet valve meanwhile has been opened. It will be understood that when this reversal takes place the cooling to the first heat exchanger is interrupted and is replaced by a flow of steam which melts the condensed solidified sulfur which then drains back through the inclined conduits and into the reservoir conduit 36. In this manner, the system by periodic reversals of heating and cooling in heat exchangers 40 and 41 may be operated continuously and under a desirable constant pressure. Such operation permits a stabilization of the process and reduces the possibility of wide excursions of temperature or pressure, which would be undesirable in a hydrogen sulfide plant.

As an example of one satisfactory operation of equipment of the type described, the pressure maintained by valve 68 was 69 p. s. i. g., while the pressure in the vessel 11 was 70 p. s. i. g., and the pressure of hydrogen pump 16 was 80 p. s. i. g. At the same time the temperature in the vapor space above sulfur level 21 in the reactor was 912° F.; in the conduit 35 was 330° F.; in conduit 33 was 95° F.; in stack 34 was 355° F.; and in header 66 was 100° F. The significance of these temperature values will later become apparent.

Passing now to Fig. 2, one form of a suitable reactor vessel 11 is disclosed, although many other forms, such as the form shown diagrammatically in Fig. 4, may be employed without departing from the broader aspects of my invention. Vessel 11 is adapted to contain the reactants at the highest pressures and temperatures of the system and in recognition of the traditional hazards of synthesizing hydrogen sulfide, it is formed of a material such as stainless steel or equivalent. At an upper location above the sulfur level 21 a steam jacketed connection 70 leading to conduit 30 is provided.

As an important feature of the invention, the vapor space 72 shown above the level of sulfur forms a reaction zone in which superheated sulfur vapor and hydrogen gas substantially complete their exothermic reaction. Accordingly this space is designed to occupy a significant volume of the reaction vessel 11. Experience has shown that unless adequate space is provided, the yield of hydrogen sulfide is reduced. Accordingly I prefer to employ a vapor space 72 of about one-third to two-thirds of the enclosed volume of the vessel while at the same time submerging any baffling structure beneath the sulfur level 21.

The incoming hydrogen furnished from conduit 14 preferably is distributed in a uniform manner centrally of the vessel adjacent the bottom thereof, as by a perforated distribution pipe 73 having a plurality of apertures at the bottom of that pipe.

Make-up and recycle molten sulfur enters the vessel through the steam jacketed pipe 74 connected to the curved downcomer 18 and is directed toward the bottom of the vessel well below the surface of the molten bath therein. At the bottom of the vessel a steam jacketed outlet 76 is adapted to be connected to the drainage conduit 22.

Under the pressure of about 70 p. s. i. g. and temperature of about 900° F. in vapor space 72, the bath of molten sulfur is near its boiling point at atmospheric pressure. As the finely dispersed hydrogen gas rises from the apertures of pipe 73, its bubbling action through the molten sulfur furnishes substantial agitation thereto. However, merely permitting the gas to bubble through the bath in a single passage therethrough would give only a limited time for reaction. Therefore, as a chief feature of the invention, I provide for the use of a plurality of vapor spaces and for an extended path of travel of reactants, in order that ample time may be permitted for the reaction and simultaneously the exothermic heat of reaction may be employed to the maximum. Furthermore, I provide for a recurring bubbling action of the hydrogen through the molten sulfur. In this way yields as high as 96% may be obtained with a concomitant savings in heating and cooling loads otherwise required.

A convenient apparatus for accomplishing these purposes is shown in Figs. 2 and 3 as comprising a simple inverted imperforate container having a top 80 and a depending skirt 81 provided at its edge with a serrated configuration 82. Since it is desired to subdivide the gas passing from one vapor space to another into small bubbles, the serrations may conveniently be of a saw tooth shape and of a relatively small size and large number. In order to avoid any short-circuiting, the edge of the skirt preferably is horizontal. A pair of elongated imperforate baffles 83 and 84, welded at their lower edges to the interior of vessel 11 and provided with bridging imperforate end members 85 and 86 provide a support for the container 80 as by means of brackets 87. Furthermore, the rectangular baffle and end member structure directs the hydrogen gas as it rises upwardly.

Therefore, as the hydrogen gas bubbles upwardly in its initial passage it is confined, together with vaporized sulfur, beneath the imperforate top 80 and forms a first vapor space 92 above the adjacent level 93 of the sulfur bath, the latter level being determined by the point at which gases can escape from said first vapor space. This vapor space comprises a hot reaction zone in which a gas phase reaction between sulfur and hydrogen can occur and with the evolution of exothermic heat. Such heat is radiated to the surrounding bath of sulfur and also is conducted to that bath by the structure of the container and the baffles, both of which preferably are of a good heat conducting metal.

Furthermore, some additional transfer of heat occurs as the pressure within vapor space 92 forces the mixture of hot hydrogen sulfide and the unreacted sulfur vapor and hydrogen, in the form of a new series of bubbles, around the serrations 82 and upwardly through the surrounding bath of molten sulfur. This movement of the reactants from the first vapor space 92 to the second or terminal vapor space 72 provides agitation to the molten bath; transfers additional exothermic heat to that bath; extends the period of contact time between the hydrogen and the sulfur and brings newly formed hydrogen bubbles into surface contact with the molten sulfur with improved diffusion and vaporization.

Preferably the baffles which confine and direct the hydrogen gas for collection in vapor space 92 should be of a height permitting the supported container 80 to be wholly immersed in the bath of molten sulfur and at the same time to provide a substantial volume of vapor space 92. Since the yield is dependent upon intimate and prolonged contact of the reactants and since it is desired for safety and economic reasons to complete the reaction within the main reactor vessel, the combined volume of vapor spaces 92 and 72, therefore, comprise a substantial portion of the total volume of the reactor vessel.

For a given installation, the system pressure control valve 68 is set for most efficient operation. When the pressure for which it is set is reached, the mixture of hot hydrogen sulfide with about 4% of unreacted hydrogen and with excess vaporized sulfur pass outwardly from the reactor vessel through the steam jacketed conduit 30 and into the cooler 31. In this cooler the bulk of that excess sulfur is condensed into a liquid and returns as recycle material to the reactor vessel as above described.

Other apparatus for carrying out the process may be employed, as for example the cylindrical reactor vessel 111 shown in Fig. 4.

As shown, this vessel is inclined from the horizontal and is supported upon a suitable framework 112. At its lower end a heating jacket 113 is provided, which jacket may receive heat from any suitable source such as electrical heating means, super-heated steam, or the like. By means of a sparger pipe 114 gaseous hydrogen may be supplied to the lower end of the vessel under a pressure effected by the pump 115. Likewise molten sulfur may be supplied to the lower end of the vessel by a conduit 116 and a pressure pump 117.

At its upper end the vessel, in one design, may be provided with a cooling jacket or head 120 to which a coolant, such as water, may be supplied through a conduit 121 under control of a valve 122. Steam generated during the cooling may be removed through conduit 124 under control of valve 125, thus avoiding substantial pressure differentials on the two sides of the vessel head 120. Normally the level of the coolant as indicated at 126 is maintained high enough to provide a good heat exchange for the major portion of the surface of the vessel head 120. As an alternative cooling arrangement, a simple cooling coil, through which a coolant may be externally supplied and removed, may be disposed in the gas space beneath the vessel outlet. From an upper portion of the reactor vessel an outlet conduit 130 is provided for the purpose of evacuating the synthesized hydrogen sulfide, any unreacted hydrogen gas, and any sulfur vapor. An insulating jacket which may comprise an inner covering 131 of diatomaceous fire brick, or equivalent, and an outer covering 132 of rock-wool, or asbestos, preferably covers the exposed surface of the reactor vessel between the heating jacket 113 and the region of the outlet 130.

By means of this modified form of reactor vessel the effluent gases passing into outlet 130 may be led directly into the subsequent processing equipment disclosed in detail in Fig. 1 without passing through a separate cooler 31. Normally the gases from outlet 130 would pass directly to conduit 35 and thence into header 36, shown on Fig. 1. The exothermic reaction of the reactants is substantially complete by the time the gases reach conduit 130 with the result that only the reactor vessel 111 and its internal parts need to be constructed of the more expensive construction materials.

Depending from the upper arch of the vessel 111 and forming a gas tight joint with the inner surface thereof is a series of imperforate heat conducting metal baffles 140, 141 and 142, one of which is shown in Fig. 5. These baffles are provided with a serrated, lower, generally linear edge 143 and are mounted with such edge horizontal and spaced from the lower surface of the reactor vessel. Moreover, the baffles are spaced from each other along the length of the vessel forming vapor spaces 150, 151, 152 and 153, respectively. It will be understood that the number of vapor spaces may be widely varied without departing from the invention but that in any event at least two vapor spaces are required. Beyond the final baffle and serving as a means of defining vapor space 153 a special, heat-resistant, baffle 154 is provided for obstructing the flow of entrained sulfur outwardly into conduit 130. This baffle may be formed of diatomaceous brick and is supported from the upper arch of the vessel forming a gas tight joint therewith. However, it is not provided with a lower, serrated edge as in the case of the companion metal baffles. For maintaining uniform velocity of the materials moving through vapor spaces 151, 152 and 153, intermediate baffles 155, 156 and 157 may, when desired, be disposed within those spaces. One such baffle is shown in Fig. 6 and is provided with a cutaway lower edge 159 and a cutaway upper edge 158, the remainder of its periphery being adapted to fit closely against the inner surface of the cylindrical reactor vessel. The cutaway edges of such baffles preferably are mounted horizontally.

When thus employed the baffle permits open communication of the sulfur bath along the bottom of the vessel and at the same time lengthens the path of the gaseous reactants passing through the respective vapor spaces, thus establishing a more uniform velocity of the moving mass of vapors.

With this structure in mind the operation may be conducted as follows: At start the pump 117 supplies molten sulfur at a temperature of at least about 260° F. to the lower end of the vessel until the edge of baffle 140 is submerged. Heating jacket 113 may then heat the molten bath to within the range of 850–900° F., hydrogen gas meanwhile may be supplied through sparger pipe 114 and may be collected along with sulfur vapor in reaction space 150. Thereafter additional sulfur may be supplied by pump 117 until each of the baffles is submerged at its lower end as indicated by Fig. 4.

At the same time a pressure of about 75 p. s. i. g. is built up in each of the vapor spaces and in the outlet conduit 130, the level of molten sulfur meanwhile adjusting itself to the lower serrated edges of the baffles. After thus filling the reactor vessel, pump 117 thereafter is required only to supply make up sulfur, and after the start up the heat required from jacket 113 may be substantially diminished, or even cut off completely. As the reaction proceeds in the hot reaction zone 150, hydrogen sulfide gas formed therein together with excess hydrogen and superheated sulfur vapor escape under the surface of the bath at the serrated edge of baffle 140, pass around the top of intermediate baffle 155, and rise through the bath into the second vapor space or hot reaction zone 152. Thereafter the mixture passes in sequence through zones 152 and 153 meanwhile having an extended path of travel and an extended period of contact time for completion of the reaction. As is obvious, the bath of molten sulfur is agitated by the passage of the gas mixture therethrough.

Upon reaching terminal zone 153 the reactants have substantially completed their reaction and the concomitant evolution of exothermic heat. It has been estimated that in the order of 55% of the hydrogen conversion takes place in vapor space 150, 25% in space 151; 11% in space 152 and only 5% in space 153. Accordingly, the gases escaping under the lower edge of baffle 154 may be immediately cooled without reducing the yield of sulfide to any practicable degree. As such gases, therefore, contact the cool surface of jacket 120 or other cooling means sulfur begins to condense and the amount of such sulfur carried out through conduit 130 is diminished.

As in the case of the reactor vessel shown in Fig. 2, it is desirable that the combined volumes of the vapor spaces of vessel 111, in which spaces the gas phase reaction takes place, be at least one-third and, if convenient, as much as two-thirds of the total volume of the vessel.

Having thus described the invention, it is realized that various modifications of the method herein described may be made by those skilled in the art without departing from the spirit or intent of the invention set forth. Accordingly, it is intended that no limitation be placed upon the scope of my invention except as may be imposed by the appended claims.

I claim:

1. The method of producing hydrogen sulfide by synthesis from its elements comprising, collecting sulfur vapor from a bath of molten sulfur in a confined space under superatmospheric pressure, passing gaseous hydrogen through said bath in contact therewith and into said confined space, contacting and reacting said gaseous hydrogen with said vapor in said space, to form a gaseous mixture of hydrogen, hydrogen-sulfide, and sulfur vapor, and extending the duration of said reaction and increasing the yield of hydrogen sulfide by passing the entire mixture through said bath in contact therewith and into a second confined vapor space, said second space being in contact with said bath.

2. The method of producing hydrogen sulfide by synthesis from its elements comprising, collecting sulfur vapor from a bath of molten sulfur in a confined space under superatmospheric pressure, passing gaseous hydrogen through said bath and collecting the hydrogen in said space, contacting and reacting said hydrogen and said sulfur vapor in said space to form a gaseous mixture of hydrogen, hydrogen-sulfide, and sulfur vapor with evolution of exothermic heat and utilization of said heat by said bath, extending the duration of said reaction and increasing the yield of hydrogen sulfide by passing the entire mixture through said bath in contact therewith, and recollecting the reacted and unreacted components of said mixture together with additional sulfur vapor in a second confined space under superatmospheric pressure and continuing the reaction thereof in contact with the surface of said bath.

3. In a method for producing hydrogen sulfide by synthesis from its elements, the steps comprising initially reacting vaporized sulfur and gaseous hydrogen under superatmospheric pressure in a confined space in contact with and at least in part below the uppermost surface of a bath of molten sulfur to form a mixture of hydrogen, hydrogen-sulfide and sulfur vapor with evolution of exothermic heat said hydrogen entering said space by passage through said bath in contact therewith, and utilizing said pressure in said first mentioned space to move the entire mixture through said bath to a second confined space for continuation of said reaction therein each of said confined spaces being in contact with the same bath, said mixture during its movement to said second space serving to agitate said bath, and said exothermic heat serving to heat said bath.

4. In a method for producing hydrogen-sulfide by synthesis from its elements in a gaseous phase reaction of extended duration, the steps comprising initially reacting vaporized sulfur and gaseous hydrogen in a first confined vapor space under superatmospheric pressure serving as a first hot reaction zone, said hydrogen entering said space by passage through a bath of molten sulfur in contact therewith, passing the entire mixture of reacted and unreacted gases through said bath of molten sulfur into a second confined vapor space under superatmospheric pressure, serving as a second hot reaction zone, and reacting in said second zone additional vaporized sulfur and residual unreacted hydrogen from said first zone, each of said vapor spaces being in contact with the same bath of molten sulfur and with exothermic heat evolved during reaction in each space being applied to the same bath.

5. The method of producing hydrogen sulfide by synthesis from its elements with a high yield and rate of production comprising, passing gaseous hydrogen through a bath of molten sulfur in contact therewith, reacting vaporized sulfur from said bath together with said gaseous hydrogen initially in a confined vapor space comprising a first hot reaction zone, extending the time of reaction and period of contact of the reactants by passing said reactants slowly through and in agitating contact with said bath of molten sulfur and into a separate confined vapor space comprising a terminal hot reaction zone, and substantially completing the reaction of the remaining unreacted reactants in said terminal zone, each of said vapor spaces being in contact with the same bath.

6. The method of producing hydrogen sulfide by synthesis from its elements comprising, vaporizing sulfur from a bath of molten sulfur, bubbling hydrogen gas through said bath, collecting said vaporized sulfur and hydrogen gas as reactants in a confined vapor space comprising a first hot reaction zone, maintaining a gas pressure within said first zone sufficient to force the mixture of reacted and unreacted gases therefrom as bubbles through said bath and into a second confined vapor space comprising a second hot reaction zone, collecting said mixture together with additional vaporized sulfur from said bath in said second vapor space, and continuing the reaction in contact with the surface of said bath, each of said vapor spaces being in contact with the same bath.

7. The method of producing hydrogen sulfide by synthesis from its elements comprising, passing gaseous hydrogen through a bath of molten sulfur in contact therewith, collecting a body of vaporized sulfur and gaseous hydrogen as reactants and initiating an exothermic reaction therebetween in a confined vapor space comprising a first hot reaction zone, and passing the reaction heated mixture of reacted and unreacted gases through said bath of molten sulfur in contact therewith and into a second confined vapor space comprising a second hot reaction zone in which the exothermic reaction is substantially completed, said zones being spaced from each other sufficiently to afford an extended length of travel of said reactants, each of said vapor spaces being in contact with the same bath.

8. A method of producing hydrogen sulfide comprising, maintaining molten sulfur at a temperature substantially below its boiling temperature under the operating pressure, passing hydrogen gas through said sulfur to strip sulfur vapor therefrom, collecting hydrogen and evolved sulfur vapor in a confined zone in contact with said molten sulfur, the pressure and temperature in said zone being such that hydrogen sulfide is formed by a synthesis reaction, conducting the thus formed hydrogen sulfide and unreacted hydrogen again through molten sulfur while transferring some of the exothermic heat of reaction to said molten sulfur and stripping additional sulfur vapor from said molten sulfur, collecting the resultant gaseous mixture of hydrogen sulfide, hydrogen and sulfur vapor in a second confined zone in contact with molten sulfur, and there reacting previously unreacted hydrogen with sulfur vapor to form additional hydrogen sulfide in said second zone.

9. A method of forming hydrogen sulfide by synthesis comprising, maintaining a body of molten sulfur at a temperature at least about 800° F. but less than its boiling temperature under the pressure applied, introducing gaseous hydrogen into said body beneath the surface thereof, transferring heat to said hydrogen as it passes upwardly through said body to raise the temperature of said hydrogen to approximately the temperature of said body, simultaneously vaporizing sulfur from said body, reacting hydrogen with said vaporized sulfur above a surface of said body and within a confined space to produce hydrogen sulfide, conducting the thus formed hydrogen sulfide back through said body of sulfur together with unreacted gaseous sulfur and hydrogen and thereby transferring some of the exothermic heat of reaction to the body of molten sulfur, reacting substantially all of the unreacted hydrogen with sulfur vapor in a second confined space above said body of molten sulfur, withdrawing gases from said second confined space, the withdrawn gases consisting essentially of hydrogen sulfide and sulfur vapor, cooling the withdrawn gases to condense the sulfur, and returning the condensed sulfur to said body.

10. In a method for producing hydrogen-sulfide by synthesis from its elements in a gaseous phase reaction of extended duration, the steps comprising initially reacting vaporized sulfur and gaseous hydrogen in a first confined vapor space under superatmospheric pressure serving as a first hot reaction zone, causing said hydrogen to enter said space by passage through a body of molten sulfur in contact therewith and conducting the entire mixture of hot reacted and unreacted gases from said space through molten sulfur into a second confined vapor space under superatmospheric pressure to thereby transfer to the molten sulfur exothermic heat of reaction which is developed in said first space and is carried from said first space by said hot gases.

References Cited in the file of this patent

UNITED STATES PATENTS

| | | |
|---|---|---|
| 1,391,568 | Nelson | Sept. 20, 1921 |
| 1,700,578 | Bacon | Jan. 29, 1929 |
| 2,092,794 | Bacon et al. | Sept. 14, 1937 |
| 2,214,859 | Maude et al. | Sept. 17, 1940 |
| 2,474,066 | Preisman et al. | June 21, 1949 |
| 2,534,792 | Nevins et al. | Dec. 19, 1950 |

FOREIGN PATENTS

| | | |
|---|---|---|
| 558,432 | Germany | Sept. 7, 1932 |

OTHER REFERENCES

Ser. No. 393,258 (A. P. C.), published July 13, 1943.

UNITED STATES PATENT OFFICE
CERTIFICATE OF CORRECTION

March 3, 1959

Patent No. 2,876,070

William W. Roberts, Jr.

It is hereby certified that error appears in the printed specification of the above numbered patent requiring correction and that the said Letters Patent should read as corrected below.

Column 1, line 24, after "used" insert -- structural materials; the gas is explosive; the formation of the compound from its elements entails a very substantial exothermic re- --.

Signed and sealed this 23rd day of June 1959.

(SEAL)
Attest:

KARL H. AXLINE
Attesting Officer

ROBERT C. WATSON
Commissioner of Patents